G. W. GREENE.
VALVE BASE FOR PNEUMATIC TIRES.
APPLICATION FILED MAY 21, 1910.
995,961.
Patented June 20, 1911.
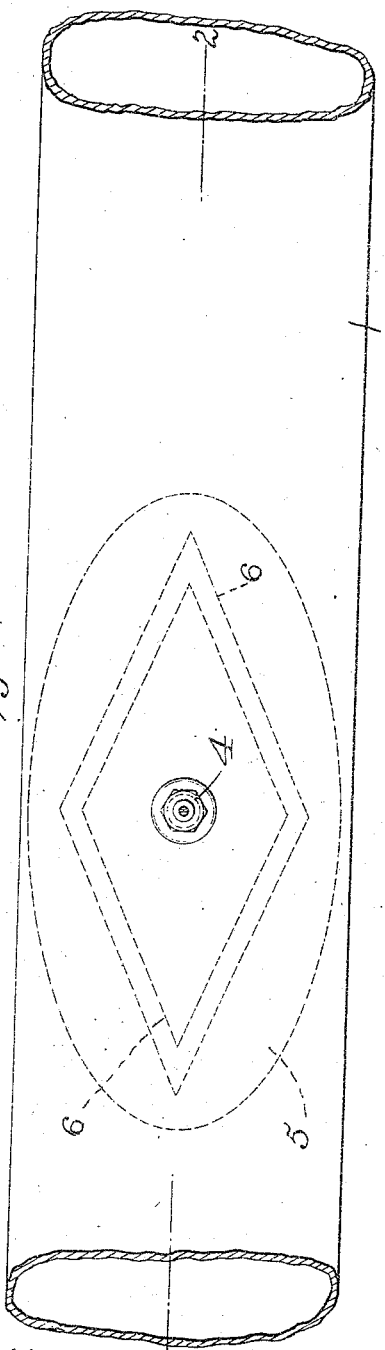
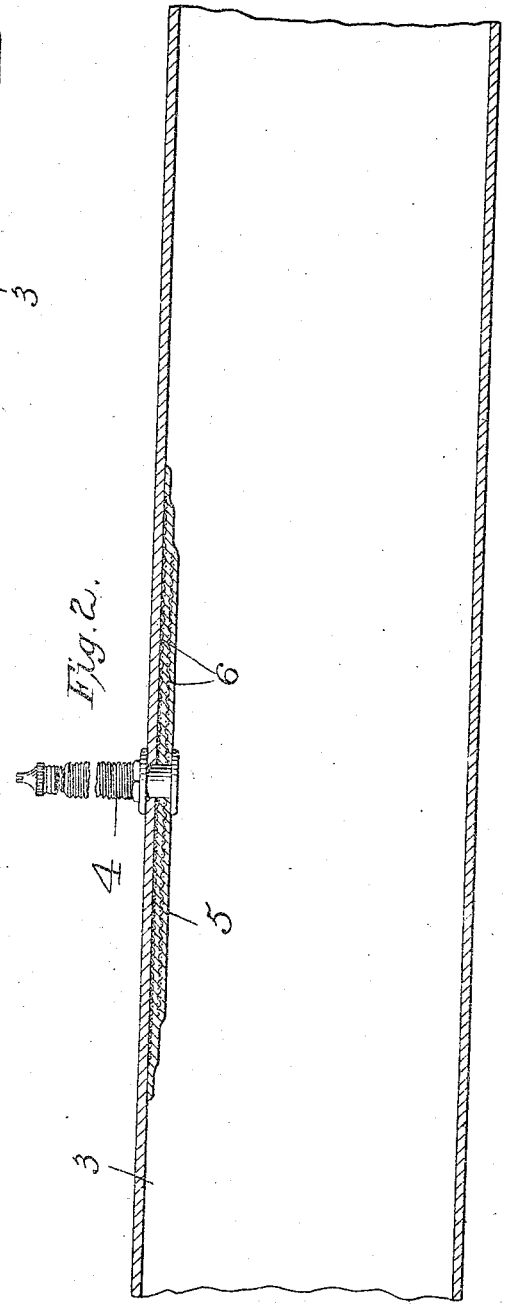
Inventor:
George W. Greene,

UNITED STATES PATENT OFFICE.

GEORGE W. GREENE, OF WATERTOWN, MASSACHUSETTS, ASSIGNOR TO SHAWMUT TIRE COMPANY, OF BOSTON, MASSACHUSETTS.

VALVE-BASE FOR PNEUMATIC TIRES.

995,961.   Specification of Letters Patent.   Patented June 20, 1911.

Application filed May 21, 1910. Serial No. 562,734.

*To all whom it may concern.*

Be it known that I, GEORGE W. GREENE, citizen of the United States, residing at Watertown, Massachusetts, have invented certain new and useful Improvements in Valve-Bases for Pneumatic Tires, of which the following is a specification.

My present invention relates to improvements in inner tubes for double tube pneumatic tires and comprises the novel features of construction hereinafter described and particularly set forth in the appended claim.

A portion of an inner tube constructed in accordance with my invention is shown in the accompanying drawing in which, Figure 1 is a plan view, and Fig. 2 is a section on line 2—2 of Fig. 1.

Referring by reference characters to this drawing the numeral 3 designates the ordinary rubber inner tube and 4 the valve stem, these being of the ordinary construction except as hereinafter specified.

In tubes as heretofore constructed it has been found necessary to reinforce the tube in proximity to the valve stem as the pure rubber of which the tube is made is not of sufficient strength to withstand the strain of the metallic valve stem which is concentrated upon a small area. Such reinforcements have been placed upon the outside of the tube but have been found to be open to serious objection in that in case of a break or rupture either through the reinforcement or close to the edge thereof, it is very difficult to apply a repair patch which will be at all permanent.

According to my invention I apply the reinforcement 5, which is composed of rubber reinforced by fabric indicated at 6, to the inside of the tube, the outline of the reinforcement being indicated by dotted lines in Fig. 1. This leaves a perfectly smooth and unobstructed outer surface around the valve stem which is capable of being patched or repaired in the same manner and with the same facility and durability as to results as is any other part of the tube. Another feature of advantage of such a construction is that when the valve is put into the base, and the tube is ready to insert, the valve base is in a concave position. This has the tendency of holding the tube away from the rim while the shoe is being put in place, and the rim is put on, this keeping the tube from being pinched with the iron or the toe of the shoe as is so often done. Of course when the air is pumped inside, it forces the tube to take its normal position.

Having thus described my invention what I claim is:

As an article of manufacture an inner tube for pneumatic tires composed entirely of rubber and having at a suitable point upon the inner face thereof a plane patch or reinforcement composed of layers of fabric and rubber vulcanized together and to the inner surface of the tube for the support of a metal valve stem, substantially as described.

In testimony whereof, I affix my signature in presence of two witnesses.

GEORGE W. GREENE.

Witnesses:
 A. C. POLLARD,
 JAMES J. SMITH.